(12) United States Patent
Yu et al.

(10) Patent No.: US 11,404,010 B2
(45) Date of Patent: Aug. 2, 2022

(54) DISPLAY APPARATUS, METHOD FOR CONTROLLING SAME, AND COMPUTER-READABLE STORAGE MEDIUM

(71) Applicant: Appotronics Corporation Limited, Shenzhen (CN)

(72) Inventors: Xin Yu, Shenzhen (CN); Fei Hu, Shenzhen (CN); Yi Li, Shenzhen (CN)

(73) Assignee: Appotronics Corporation Limited, Shenzhen (CN)

( * ) Notice: Subject to any disclaimer, the term of this patent is extended or adjusted under 35 U.S.C. 154(b) by 0 days.

(21) Appl. No.: 17/278,046

(22) PCT Filed: Aug. 14, 2019

(86) PCT No.: PCT/CN2019/100478
§ 371 (c)(1),
(2) Date: Mar. 19, 2021

(87) PCT Pub. No.: WO2020/057296
PCT Pub. Date: Mar. 26, 2020

(65) Prior Publication Data
US 2021/0383766 A1 Dec. 9, 2021

(30) Foreign Application Priority Data
Sep. 21, 2018 (CN) .......................... 201811109862.2

(51) Int. Cl.
*G09G 3/34* (2006.01)
*G09G 3/00* (2006.01)
*H04N 9/31* (2006.01)

(52) U.S. Cl.
CPC ............. *G09G 3/3413* (2013.01); *G09G 3/00* (2013.01); *H04N 9/3158* (2013.01);
(Continued)

(58) Field of Classification Search
CPC ................. G09G 3/3413; G09G 3/00; G09G 2320/0666; H04N 9/3161; H04N 9/3158; H04N 9/3182
See application file for complete search history.

(56) References Cited

U.S. PATENT DOCUMENTS

2018/0129124 A1* 5/2018 Hu ..................... H04N 9/3114
2018/0252993 A1 9/2018 Akiyama

FOREIGN PATENT DOCUMENTS

CN 202615106 U 12/2012
CN 204595411 U 8/2015
(Continued)

OTHER PUBLICATIONS

Chinese Office Action dated Mar. 15, 2021, Application No. 2018111098622.
(Continued)

*Primary Examiner* — Kenneth B Lee, Jr.
(74) *Attorney, Agent, or Firm* — The Dobrusin Law Firm, PC

(57) ABSTRACT

A display device includes a control device configured to divide a display period of each frame of an image to be displayed into a first time period and a second time period; and send a light source control signal and a modulation signal corresponding to each pixel in the image to be displayed, according to original image data of each frame of the image to be displayed; a light source system configured to emit light source light according to the light source control signal, the light source light including first light and second light; and a light modulation device configured to modulate the first light according to the modulation signal to generate first image light of the image to be displayed, and
(Continued)

modulate the second light according to the modulation signal to generate second image light of the image to be displayed.

20 Claims, 4 Drawing Sheets

(52) U.S. Cl.
CPC ......... *H04N 9/3161* (2013.01); *H04N 9/3164* (2013.01); *H04N 9/3182* (2013.01); *G09G 2320/0666* (2013.01)

(56) References Cited

FOREIGN PATENT DOCUMENTS

| | | |
|---|---|---|
| CN | 204595412 U | 8/2015 |
| CN | 106154712 A | 11/2016 |
| CN | 108227355 A | 6/2018 |
| EP | 2683160 A2 | 8/2014 |
| JP | 2004070017 A | 3/2004 |
| WO | 2012147442 A1 | 11/2012 |
| WO | 2018126561 A1 | 7/2018 |

OTHER PUBLICATIONS

International Search Report dated Nov. 12, 2019, Application No. PCT/CN2019/100478.

\* cited by examiner

DISPLAY APPARATUS, METHOD FOR CONTROLLING SAME, AND COMPUTER-READABLE STORAGE MEDIUM

This application is a National Stage application of PCT international application PCT/CN2019/100478, filed on Aug. 14, 2019 which claims priority to Chinese Patent Application No. 201811109862.2, filed with the Chinese Patent Office on Sep. 21, 2018, both of which are incorporated herein by reference in their entireties.

TECHNICAL FIELD

The present disclosure relates to the technical field of display, in particular to a display device, a method for controlling the same and a nonvolatile computer-readable storage medium.

BACKGROUND

This section is intended to provide background or context for embodiments of the present disclosure described in the claims. It is not recognized that the description herein is the prior art because it is listed in this part.

Generally, in a laser phosphor source of a display device, a blue laser source is used as a short-wavelength excitation light source to excite the wavelength conversion material on the color wheel to generate red-green primary-color light, and the blue laser source itself emits blue primary-color light. However, the laser provided in the light source has a high cost for heat dissipation and an obvious laser speckle phenomenon, and fluorescent light emitted by the light source covers a relatively narrow color gamut range. In order to expand the color gamut range of the display device with a low cost, the laser fluorescent light emitted by the light source system is combined with RGB laser light, which can effectively play their advantages and make up for their respective shortcomings. For example, by adding a small amount of red and green lasers to the laser phosphor source, the color gamut of the display device can be effectively expanded. Furthermore, the speckle effect of pure laser can be greatly weakened by adding the fluorescent light. Although the speckle cannot be completely eliminated, the contrast of the speckle is greatly reduced by adding the fluorescent light. Thus, the speckle cannot be detected by human eyes. In addition, because high-power red and green laser light are not needed, the complex heat dissipation system, which is necessary for RGB laser sources, is not needed, thus greatly reducing the cost of the system.

However, when a spatial separation method is used to modulate laser light and fluorescent light emitted by the light source separately, an extra spatial light modulator should be introduced. Thus, the display device has an increased cost and is only suitable for high-end projection device.

SUMMARY

In order to solve the technical problem of increasing system cost caused by expanding color gamut of a display device in prior art, a display device for expanding color gamut at a low cost is provided according to the present disclosure, and a method for controlling the display device and a nonvolatile computer-readable storage medium are also provided according to the present disclosure.

A display device includes:
a control device configured to divide a display period of each frame of an image to be displayed into a first time period and a second time period; and send a light source control signal and a modulation signal for each pixel in the image to be displayed, according to original image data in each frame of the image to be displayed;
a light source system configured to emit light of light source according to the light source control signal, wherein the light of light source comprises:
  first light emitted in the first time period, where the first light includes three primary-color components; and
  second light emitted in the second time period, wherein the second light includes laser light, and the laser light included in the second light and at least part of primary-color light in the first light are metameric light; and
a light modulation device configured to respectively modulate the first light and the second light according to the modulation signal to generate first image light and second image light of the image to be displayed.

A method for controlling a display device comprises following steps:
dividing a display period of each frame of an image to be displayed into a first time period and a second time period; and generating a light source control signal, first modulation data applied to the first time period, and second modulation data applied to the second time period, according to original image data of each frame of the image to be displayed;
controlling a light source system to emit first light including three primary-color components in the first time period according to the light source control signal; and controlling the light source system to emit second light including laser light in the second time period according to the light source control signal, wherein the laser light included in the second light and at least part of primary-color light in the first light are metameric light; and
modulating the first light according to the first modulation data to generate first image data of the image to be displayed; and modulating the second light according to the second modulation data to generate second image light of the image to be displayed.

A nonvolatile computer-readable storage medium includes a computer program stored thereon, wherein the computer program, when executed by a processor, implements the steps of the method for controlling the display device as described above.

A display device, a method for controlling the same and a nonvolatile computer-readable storage medium are provided according to the embodiments of the present disclosure. The display device divides a display period of an image to be displayed into a first time period and a second time period, and controls a light source system to emit a first light in the first time period and emit a second light in the second time period. The laser light in the second light and at least part of primary-color light in the first light are metameric light, and the first light and the second light belong to different color gamut ranges. Thus, under the control of the control device, the light modulation device modulates the first light and the second light respectively. The first image light emitted in the first time period is superimposed with the second image light emitted in the second time period, by using the persistence effect of human eyes. In this way, the emergent image of the display device has an expanded color gamut range.

BRIEF DESCRIPTION OF DRAWINGS

In order to explain the technical solution of the embodiments/modes of the present disclosure more clearly, the drawings used in the description of the embodiments/modes will be briefly introduced below. Obviously, the drawings in the following description are some embodiments/modes of the present disclosure, and other drawings can be obtained according to these drawings for those skilled in the field without any inventive efforts.

SYMBOL DESCRIPTION OF MAIN COMPONENTS

| | |
|---|---|
| Display device | 10, 20 |
| Light source system | 100, 200 |
| First light source | 110, 210 |
| Second light source | 120, 220 |
| Red light emitting body | 121 |
| Green light emitting body | 122 |
| Light splitting and combining element | 125 |
| First guide device | 130 |
| First light splitting and combining element | 131 |
| Second light splitting and combining element | 132 |
| Collection lens group | 133, 134 |
| Second guide device | 240 |
| Third light splitting and combining element | 245 |
| Fourth light splitting and combining element | 246 |
| Fifth light splitting and combining element | 247 |
| Color wheel | 150, 250 |
| Substrate | 151 |
| Conversion portion | 152, 252 |
| Filter unit | 155, 255 |
| First segment | R1, R2 |
| Second segment | G1, G2 |
| Third section | B1/B2 |
| Driving unit | 159 |
| Homogenizing device | 170, 270 |
| Light modulation device | 700 |
| Control device | 800 |

The present disclosure will be further illustrated with reference to the above drawings.

DESCRIPTION OF EMBODIMENTS

In order to understand the above objects, features and advantages of the present disclosure more clearly, the present disclosure will be described in detail with reference to the accompanying drawings and specific embodiments. It should be noted that the embodiments of this application and the features in the embodiments can be combined with each other without conflict.

In the following description, many specific details are set forth in order to fully understand the present disclosure, and the described embodiments are only some embodiments of the present disclosure, but not all embodiments. Based on the embodiments of the present disclosure, all other embodiments obtained by ordinary technicians in the field without creative labor belong to the scope of protection of the present disclosure.

Unless otherwise defined, all technical and scientific terms used herein have the same meanings as commonly understood by those skilled in the technical field of the present disclosure. Terms used in the description of the present disclosure herein are for the purpose of describing specific embodiments only, and are not intended to limit the present disclosure.

Figure 1:
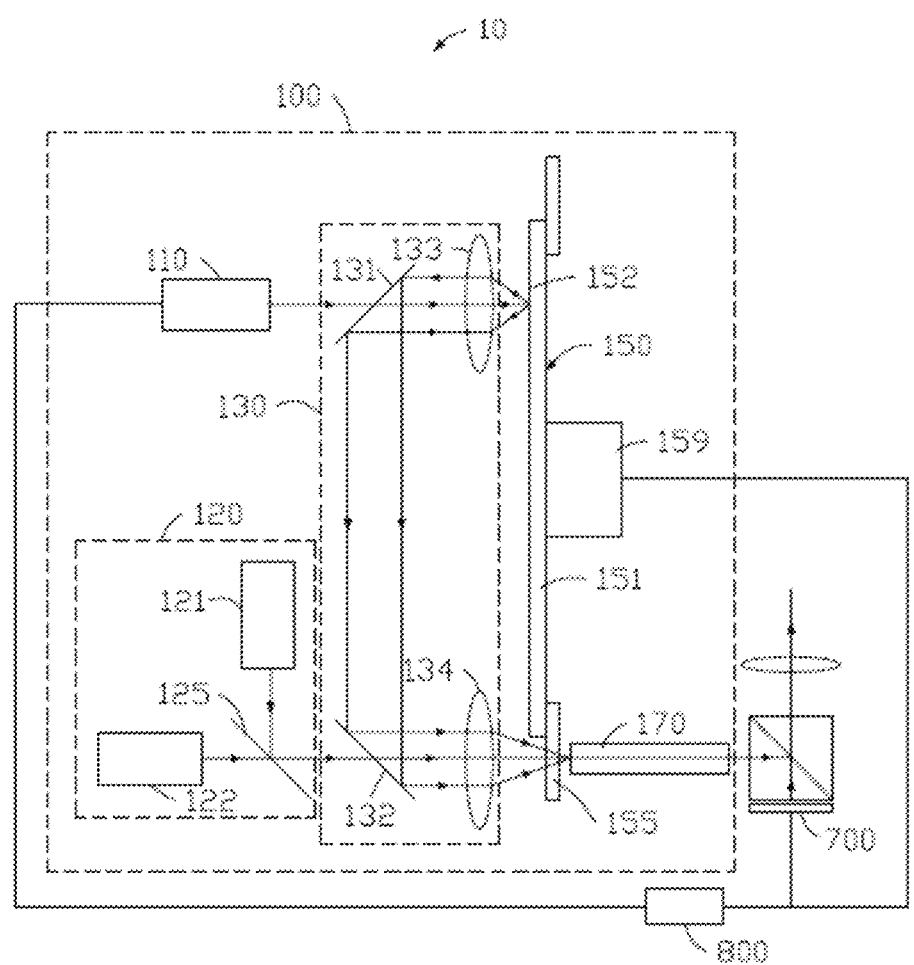
FIG. 1 is a schematic structural diagram of a display device according to a first embodiment of the present disclosure.

FIG. 1 shows a structural diagram of a display device 10 according to a first embodiment of the present disclosure. As shown in FIG. 1, the display device 10 provided by the present disclosure may be an educational projector, a laser television, a mini-projector, a theater projector, etc. In an embodiment of the present disclosure, a projector is taken as an example for explanation. In other embodiments, the display device 10 can also be the other devices mentioned above.

A display device 10, a method for controlling the display device 10, and a computer-readable storage medium are provided in the present disclosure. The display device 10 is configured to divide a display period of a frame of an image to be displayed into a first time period and a second time period, emit first image light within a first color gamut range in the first time period, and emit second image light within a second color gamut range in the second time period. When multiple frames of the image are continuously played by utilizing a persistence characteristic of human eyes, as long as the frame rate is high enough, the first image light and the second image light will not show obvious flicker when alternately displayed. The second color gamut range covers the first color gamut range and has a part beyond the first color gamut range. That is, the second color gamut range is wider than the first color gamut range. For example, the first color gamut range is DCI-P3 and the second color gamut range is REC. 2020. Since each frame of the image to be displayed is formed by imaging superposition of the first image light and the second image light, it is beneficial to expand the color gamut range of the display device 10.

As shown in FIG. 1, the display device 10 includes a light source system 100, a light modulation device 700 and a control device 800. The control device 800 is configured to divide a display period of each frame of an image to be displayed into a first time period and a second time period, and send a light source control signal and a modulation signal according to original image data of each frame of the image to be displayed. The light source system 100 is configured to emit light of light source according to the light source control signal. The light of light source includes: first light including three primary-color components and emitted in the first time period, and second light including laser light and emitted in the second time period. The light modulation device 700 is configured to modulate the first light according to the modulation signal to generate first image light of the image to be displayed, and modulate the second light according to the modulation signal to generate second image light of the image to be displayed. The first image light belongs to a first color gamut and the second image light belongs to a second color gamut. Since the laser light in the second light and at least part of primary-color light in the first light are metameric light, the first color gamut and the second color gamut have different ranges. In addition, since the second light includes laser light and the color gamut range obtained by modulating the laser light is generally wide, a second color gamut range based on the second light can cover a first color gamut range and has a part beyond the first color gamut range.

Further, the light source system 100 includes a first light source 110, a second light source 120, and a color wheel 150. In response to the light source control signal, the first light source 110 is configured to emit excitation light in the first time period. The color wheel 150 is configured to convert the excitation light into first light. The second light source 120 is configured to emit second light in the second time period. The laser light in the second light and at least part of primary-color light in the first light are metameric light.

In an embodiment, the first light source 110 is a blue light source for emitting blue light as excitation light. It can be understood that the first light source 110 may also be other color light sources such as ultraviolet light, red light and green light; or that the first light source 110 is configured to emit at least two of blue light, ultraviolet light, red light and green light. In an embodiment of the present disclosure, the light emitting body in the first light source 110 is a blue laser. The first light source 110 may include one blue laser, two blue lasers or a blue laser array. The number of lasers can be flexibly selected as demanded. In an embodiment, the light emitting body in the first light source 110 is a light emitting diode or an array of light emitting diodes.

The second light source 120 is configured to emit second light of at least one color. The second light includes laser light. In an embodiment of the present disclosure, the second light source 120 includes a red light emitting body 121, a green light emitting body 122, and a light splitting and combining element 125. The red light emitting body 121 and the green light emitting body 122 both include lasers or laser arrays. The light splitting and combining element 125 is configured to combine the red laser light emitted by the red light emitting body 121 and the green laser light emitted by the green light emitting body 122, to obtain the second light emitted from the second light source 120. Further, the light splitting and combining element 125 is a red reflecting and green transmitting dichroic splitter, which reflects red laser light and transmits green laser light. In one embodiment, the second light source 120 includes a red light emitting body 121 or a green light emitting body 122 to emit red laser light or green laser light as the second light, and the light splitting and combining element 125 is omitted. In an embodiment, the second light source 120 includes a red light emitting body 121, a green light emitting body 122 and a blue light emitting body (not shown) to emit three primary-color laser light. Accordingly, the first light source 110 may include an ultraviolet laser. The ultraviolet laser emits ultraviolet light to excite the color wheel 150, so as to generate first light. The first light includes red fluorescent light, green fluorescent light and blue fluorescent light.

In an embodiment, a light homogenizing device, such as an optical integrator rod or a fly-eye lens, is further provided on the first light source 110 and/or the red light emitting body 121 and/or the green light emitting body 122, to perform a homogenization on laser light. It can be understood that light homogenizing devices in the first light source 110, the red light emitting body 121 and the green light emitting body 122 are not necessary. Especially in a miniaturized light source system, the light homogenizing device can be omitted.

Figure 2:
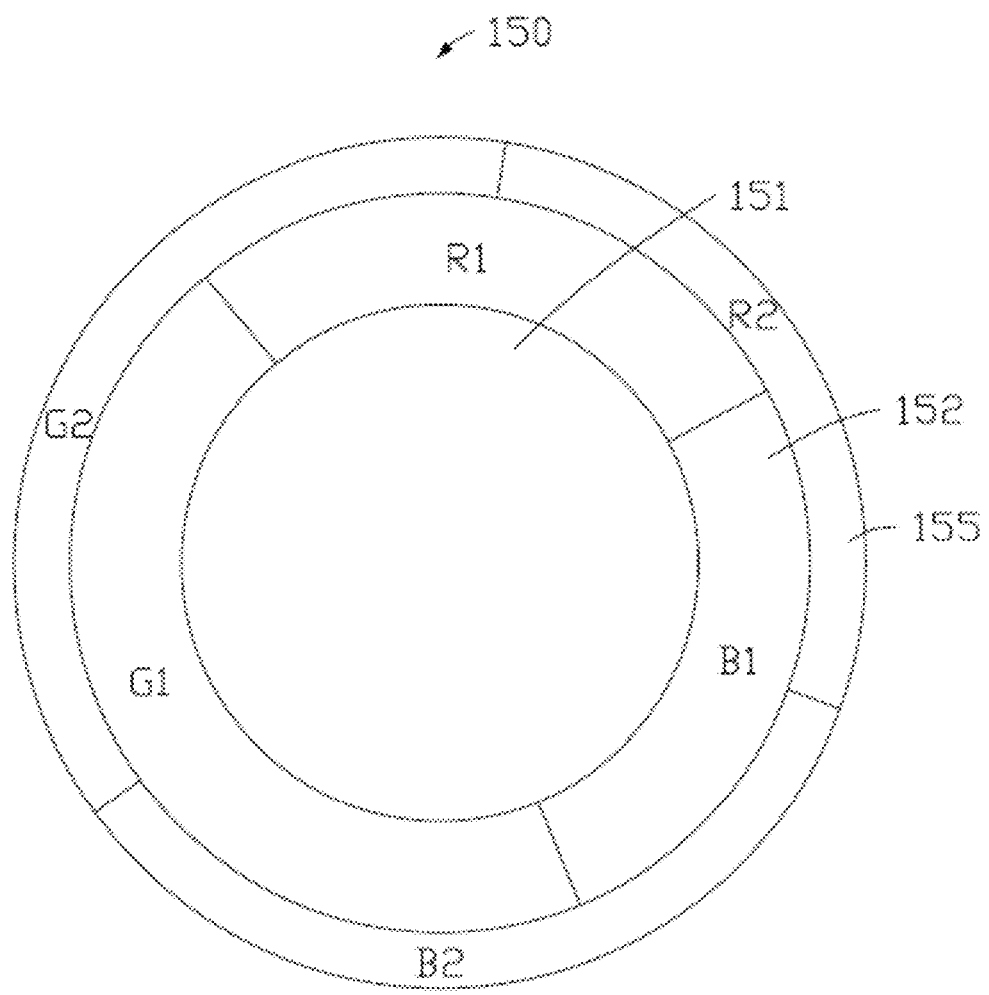
FIG. 2 is a top schematic diagram of a structure of a color wheel shown in FIG. 1.

Referring to FIG. 2, in conjunction with FIG. 1, FIG. 2 is a top schematic diagram of a structure of the color wheel 150 shown in FIG. 1. A surface of the color wheel 150 includes a substrate 151, a conversion portion 152, and a filter unit 155, where the conversion portion 152 and a filter unit 155 are disposed on the substrate 151. In an embodiment of the present disclosure, the substrate 151 has a circular shape, and both the conversion portion 152 and the filter unit 155 are annularly arranged in a radial direction of the surface of the substrate 151. An inner diameter of the filter unit 155 is larger than an outer diameter of the conversion portion 152. That is, the filter unit 155 is disposed at an edge of the substrate 151, and the conversion portion 152 is disposed between the filter unit 155 and a geometric center of the substrate 151. In an embodiment of the present disclosure, the conversion portion 152 is disposed adjacent to the filter unit 155. In other embodiments, the positions of the conversion portion 152 and the filter unit 155 can be interchanged, and the conversion portion 152 and the filter unit 155 can also be arranged at an interval.

Further, the conversion portion 152 includes a first segment R1, a second segment G1 and a third section B1, which are arranged along a circumferential direction of the surface of the color wheel 150. The first segment R1, the second segment G1 and the third section B1 can be arranged adjacent to each other or at intervals. The first segment R1 is configured to convert the excitation light into a first primary-color light. The second segment G1 is configured to convert the excitation light into a second primary-color light. The third section B1 is configured to scatter the excitation light used as the third primary-color light, to change an angular distribution of the excitation light.

Specifically, the first segment R1 is provided with a wavelength conversion material for converting excitation light into red fluorescent light. The second segment G1 is provided with a wavelength conversion material for converting excitation light into green fluorescent light. The third section B1 is provided with a scattering layer. In an embodiment where the excitation light is ultraviolet light, a wavelength conversion material for converting the excitation light into blue fluorescent light is provided in the third section B1.

In an embodiment, the conversion portion 152 is provided with a first segment and a second segment, wherein the first segment is provided with yellow phosphor for converting excitation light into yellow fluorescent light. The yellow fluorescent light includes components of red fluorescent light and green fluorescent light, and the second segment is used for scattering the excitation light.

Further, the filter unit 155 includes a first segment R2, a second segment G2 and a third section B2. The first segment R2, the second segment G2 and the third section B2 are respectively provided with a red light filter, a green light filter and a blue light filter. The first segment R2, the second segment G2 and the third section B2 respectively correspond to the first segment R1, the second segment G1 and the third section B1. Specifically, a central angle formed by each section in the filter unit 155 and the geometric center of the substrate 151 is the same as a central angle formed by the section with a corresponding color in the conversion portion 152 and the geometric center of the substrate 151. For example, the central angle formed by the first segment R1 and the geometric center of the substrate 151 is 50°, and the central angle formed by the first segment R2 and the geometric center of the substrate 151 is also 50°.

As shown in FIG. 1, the color wheel 150 further includes a driving unit 159 disposed on a bottom surface of the substrate 151. The driving unit 159 drives the substrate 151 to move periodically, so that the first segment R1, the second segment G1 and the third section B1 in the conversion portion 152 are periodically located on the optical path of the excitation light. Under the excitation of excitation light, the conversion portion 152 emits red fluorescent light, green fluorescent light and scattered excitation light in sequence. Because the red fluorescent light and the green fluorescent light emitted from the conversion portion 152 have wide spectrum and low color purity, the light emitted from each section of the conversion portion 152 needs to be filtered by the corresponding section in the filter unit 155 and then emitted, so as to obtain the first primary-color light, the second primary-color light and the third primary-color light emitted from the color wheel 150 in sequence.

A first guide device 130 is further disposed between the first and second light sources 110, 120 and the color wheel 150. The first guide device 130 is configured to guide the excitation light emitted from the first light source 110 to the conversion portion 152, and guide the light emitted from the conversion portion 152 and the second light emitted from the second light source 120 to irradiate the filter unit 155.

Specifically, the first guide device 130 includes a first light splitting and combining element 131, a second light splitting and combining element 132, and collection lens groups 133 and 134 arranged adjacent to the color wheel 150. The collection lens group 133 is disposed adjacent to the conversion portion 152 of the color wheel 150, and the collection lens group 134 is disposed adjacent to the filter unit 155 of the color wheel 150. The first light splitting and combining element 131 is arranged between the first light source 110 and the collection lens group 133, which is configured to guide the excitation light emitted by the first light source 110 to the conversion portion 152. The second light splitting and combining element 132 is arranged between the second light source 120 and the collection lens group 134, which is configured to guide the second light emitted by the second light source 120 to the filter unit 155. The light emitted from the conversion portion 152 is guided by the first light splitting and combining element 131 and the second light splitting and combining element 132 in turn, to enter the filter unit 155.

In an embodiment of the present disclosure, the first light splitting and combining element 131 is a splitting filter with area-coated film. An antireflection film is provided on the coating area, to transmit excitation light. A reflective film is provided on the area outside the coating area, so as to reflect the light emitted from the conversion portion 152 to the second light splitting and combining element 132. The second light splitting and combining element 132 is a splitting filter with area-coated film. An anti-reflection film is provided on the coating area, to transmit the second light to the filter unit 155. A reflection film is provided on the area outside the coating area, so as to reflect the light from the first light splitting and combining element 131 to the filter unit 155.

The collection lens groups 133 and 134 are configured to converge the light incident on the color wheel 150 and to collimate the light emitted from the conversion portion 152.

In this embodiment, the color wheel 150 is a reflective color wheel. It can be understood that the color wheel 150 may also be a transmissive color wheel. The filter unit 155 is disposed on the surface of the substrate 151 adjacent to the driving unit 159. Accordingly, the first light source 110 and the second light source 120 are disposed adjacent to each other, and the first guide device 130 is omitted. Alternatively, necessary guiding elements may be introduced.

As shown in FIG. 1, the light source system 100 further includes a light homogenizing device 170 disposed downstream of the color wheel 150. The emitted light filtered by the filter unit 155 are homogenized by the light homogenizing device 170 and then emitted from the light source system 100, which is beneficial to improving the uniformity of the color and brightness of the emitted light. The light homogenizing device 170 may be an optical integrator rod or a fly-eye lens.

In this way, the first light emitted from the light source system 100 is the light emitted by the filter unit 155, which includes three primary-color light. The three primary-color light includes first primary-color light, second primary-color light and third primary-color light. In an embodiment of the present disclosure, the first primary-color light is red fluorescent light, the second primary-color light is green fluorescent light, and the third primary-color light is scattered blue laser light. In a modified embodiment, the third primary-color light is blue fluorescent light. The three primary-color light are used to synthesize the white light, and the image light is based on the synthesized white light. The second light emitted by the second light source 120 includes a fourth primary-color light and a fifth primary-color light. The fourth primary-color light is red laser light and the fifth primary-color light is green laser light.

The first primary-color light and the fourth primary-color light are metameric light, namely, the first primary-color light and the fourth primary-color light are light with the same color and different spectral curves. The fourth primary-color light is laser light, which has a narrower spectrum and covers a wider color gamut range than the first primary-color light. Similarly, the fifth primary-color light and the second primary-color light are metameric light, namely, the fifth primary-color light and the second primary-color light are light with the same color and different spectral curves. The fifth primary-color light is laser light, which has a narrower spectrum and covers a wider color gamut range than the second primary-color light. The first, second and third primary-color light are used to modulate images in the first color gamut range, while the fourth primary-color light and fifth primary-color light are used to modulate images in the second color gamut range. The second color gamut range covers the first color gamut range and has a part beyond the first color gamut range.

Figure 3:
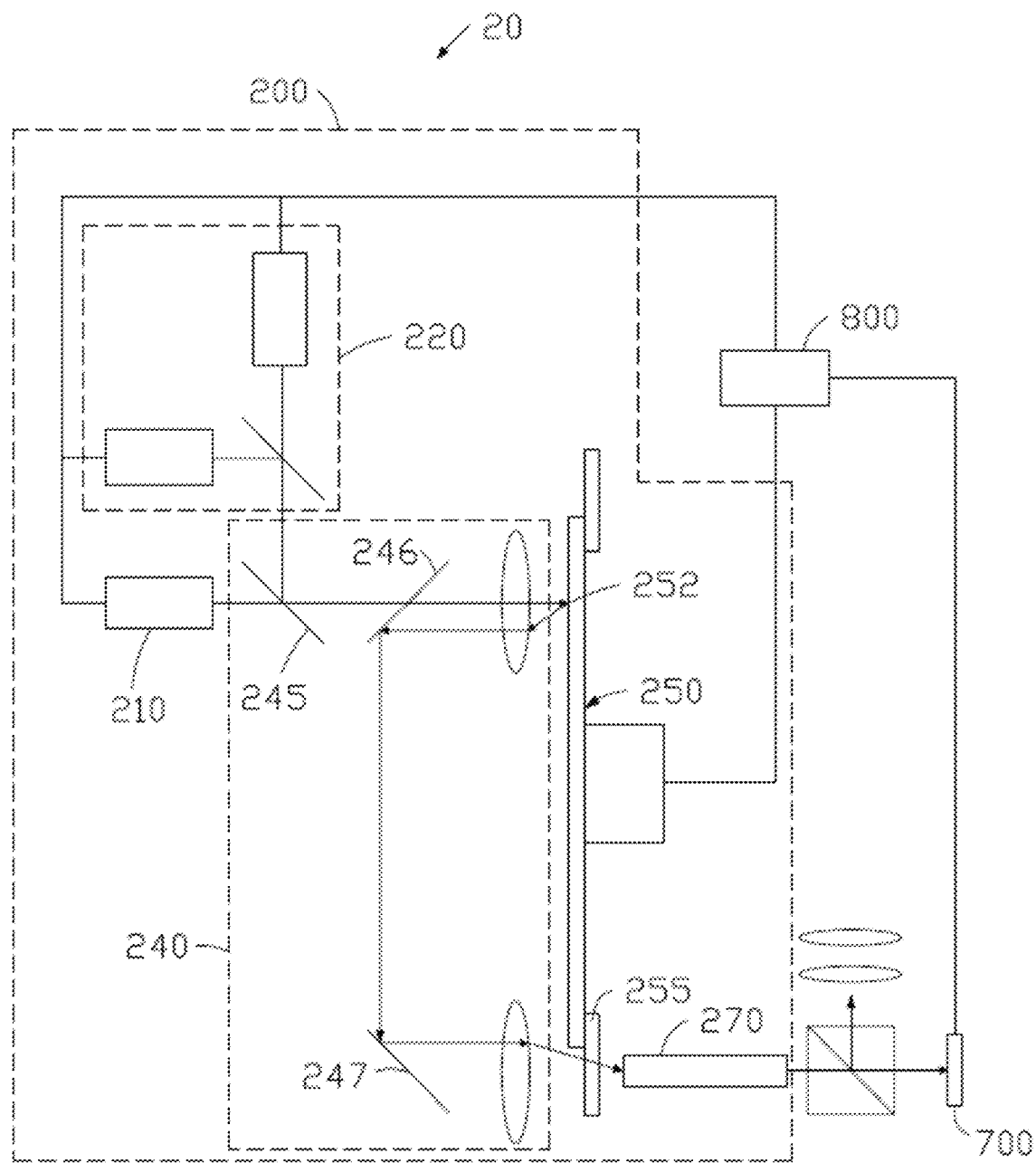
FIG. 3 is a schematic structural diagram of a display device according to a second embodiment of the present disclosure.

FIG. 3 shows a structural diagram of a display device 20 according to a second embodiment of the present disclosure. In this embodiment, the display device 20 mainly differs from the display device 10 in that the first guide device 130 in the display device 10 is replaced with a second guide device 240 in a light source system 200. The light emitted from the first light source 210 and the second light source 220 in the display device 20 enters a conversion portion 252 of a color wheel 250 under the guidance of the second guide device 240. The light emitted from the conversion portion 252 enters a light homogenizing device 270 through the second guiding device 240 and a filter unit 255 of the color wheel 250 in turn.

Further, the second guide device 240 is configured to guide the excitation light emitted by the first light source 210 and the second light emitted by the second light source 220 to the conversion portion 252. Scattering material and wavelength conversion material in the conversion portion 252 convert the second light conforming to Gaussian distribution into Lambert light for emission. The second guide device 240 is further configured to guide the first light and the second light emitted from the conversion portion 252 to the filter unit 255.

Specifically, the second guide device 240 includes a third light splitting and combining element 245, a fourth light splitting and combining element 246, and a fifth light splitting and combining element 247. The excitation light emitted by the first light source 210 and the second light emitted by the second light source 220 are guided by the third light splitting and combining element 245 and the fourth light splitting and combining element 246 in turn, to enter the conversion portion 252. The light emitted from the conversion portion 252 is guided by the fourth light splitting and combining element 246 and the fifth light splitting and combining element 247 in turn, to enter the filter unit 255. In an embodiment of the present disclosure, the third light splitting element 245 is a dichroic splitter coated with a yellow reflecting and blue transmitting film, which transmits the fourth primary-color light and the fifth primary-color light emitted by the second light source 220 and reflects the third primary-color light emitted by the first light source 210. The fourth light splitting and combining element 246 is a splitting filter coated with an anti-reflection film. A coating area of the fourth light splitting and combining element 246 is coated with the antireflection film to transmit the third primary-color light, the fourth primary-color light and the fifth primary-color light emitted from the third light splitting and filtering element 245. A reflection film is provided on an area outside the anti-reflection film, to reflect the light emitted from the conversion portion 252. The fifth light splitting and combining element 247 is used as a mirror to reflect the light from the fourth light splitting and combining element 246 to the filter unit 255.

It should be noted that, within the scope of the spirit or basic characteristics of the present disclosure, each specific scheme applicable to the first embodiment can also be correspondingly applied to the second embodiment. Thus, it is not repeated herein for the sake of saving space and avoiding repetition.

Referring to FIG. 1 again, in an embodiment of the present disclosure, the light modulation device 700 can be Liquid Crystal Display (LCD), Liquid Crystal on Silicon (LCOS), Digital Micromirror Device (DMD), etc. Preferably, the light modulation device 7M) is a monolithic DMD spatial light modulator. The video information input to the display device 10 is original image data based on an image sequence composed of multiple frames of the image to be displayed. The light modulation device 700 is configured to modulate, under the control of the control device 800, five primary-color light composed by the first primary-color light to the fifth primary-color light in the light of light source, and emit the image to be displayed in real time. A modulation period of each frame of the image to be displayed is a display period of the frame of the image to be displayed.

The control device 800 is configured to divide the display period of each frame of the image to be displayed into a first time period and a second time period, and send a light source control signal and a modulation signal corresponding to respective pixels in the frame of the image to be displayed according to the original image data of the frame of the image to be displayed. The modulation signal includes first modulation data applied to the first time period, and second modulation data applied to the second time period.

The light source system 100 is configured to emit light of light source according to the light source control signal. The light of light source includes the first light emitted in the first time period and the second light emitted in the second time period. That is, the control device 800 controls the light source system 100 to emit the first light in the first time period and emit the second light in the second time period. Specifically, under the control of the light source control signal, the first light source 110 emits light in the first time period and is turned off in the second time period. The second light source 120 emits light in the second time period and is turned off in the first time period.

Further, the control device 800 divides the first time period into a first sub-period for displaying the first primary-color light, a second sub-period for displaying the second primary-color light, and a third sub-period for displaying the third primary. The control device 8010 divides the second time period into a fourth sub-period for emitting the fourth primary-color light, a fifth sub-period for emitting the fifth primary-color light, and a sixth sub-period for not emitting light. Under the control of the light source control signal, the light source system 100 correspondingly emits the first primary-color light to the fifth primary-color light to the light modulation device 700 in the first sub-period to the fifth sub-period. The light source system 100 does not emit light in the sixth sub-period. That is, in the first time period, the first light source 110 emits excitation light. Taking the color wheel 150 moving for one cycle as an example, the first segment R1, the second segment G1 and the third section B1 of the conversion portion 152 are respectively located on the optical path of the excitation light, so as to emit the first primary-color light in the first sub-period, the second primary-color light in the second sub-period and the third primary-color light in the third sub-period. In the fourth sub-period, the first segment R2 of the filter unit 255 is located on the optical path of the second light source 220, the red light emitting body 121 in the second light source 120 emits the fourth primary-color light, and the green light emitting body 122 is turned off. Thus, the light source system 100 emits the fourth primary-color light in the fourth sub-period. In the fifth period, the second segment G2 of the filter unit 255 is located on the optical path of the second light source 220, the green light emitting body 122 in the second light source 120 emits the fifth primary-color light, and the red light emitting body 121 is turned off. Thus, the light source system 100 emits the fifth primary-color light in the fifth sub-period. In the sixth period, all light emitting bodies in the light source system 100 are turned off and no light is emitted. It can be understood that in an embodiment, the color wheel 150 rotates for an integer number of cycles greater than 1 in the first time period and the second time period. In this case, multiple periods can be correspondingly added in the first time period and the second time period to respectively modulate different primary-color light emitted from the color wheel 150.

The light modulation device 700 is configured to respectively modulate the five primary-color light of the light of light source in the first sub-period to the fifth sub-period under the control of the modulation signal. In the sixth sub-period, the light modulation device 700 does not perform light modulation.

Further, in an embodiment of the present disclosure, the original image data of each pixel in each frame of the image to be displayed is in a RGB coding format. It can be understood that in a modified embodiment, the original image data of each pixel of the image to be displayed will not be limited to RGB coding format, for example, it may be in a YUV coding format. Further, the original image data of each pixel in each frame of the image to be displayed includes three primary color original image data, such as red original image data $r_s$, green original image data $g_s$ and blue original image data $b_s$. In an embodiment, $r_s$, $g_s$, and $b_s$ can be characterized by gray scale values. For example, the three primary color original image data $r_s$, $g_s$ and $b_s$ of one pixel can be gray scale values of 100, 120 and 150, respectively.

Furthermore, the original image data based on three primary colors for each pixel in each frame of the image to be displayed includes the color gamut range to which the original image data belongs. Information of the color gamut range to which the original image data of each pixel in each frame of image to be displayed belongs is known or can be known. Specifically, in an embodiment, in addition to the three primary color image data of each pixel, the original image data of each pixel in the frame of the image to be display may also include information of the color gamut range to which it belongs. Therefore, after receiving the original image data of each pixel in any frame of the image to be displayed, the control device 800 may receive the color gamut range to which the original image data of each pixel in the frame of the image to be displayed belongs according to the information of color gamut range. In this embodiment, the original image data of each pixel in the frame of the image to be displayed can be image data within the second color gamut range.

In an embodiment, color coordinates $(x_r, y_r, Y_r)$, $(x_g, y_g, Y_g)$ and $(x_b, y_g, Y_g)$ of the three primary-color light $r_0$, $g_0$ and $b_0$ of the color gamut range, to which the original image data of one pixel in the frame of the image to be displayed belongs, in an xyY coordinate system can be expressed by the following formula 1:

$$\begin{bmatrix} r_0 \\ g_0 \\ b_0 \end{bmatrix} = \begin{bmatrix} x_r & y_r & Y_r \\ x_g & y_g & Y_g \\ x_b & y_b & Y_b \end{bmatrix}.$$ (Formula 1)

It can be understood that the xyY coordinate system can be defined in CIE 1931 standard. In CIE 1931, absolute color and brightness of color that can be distinguished by any human eye are defined by three-dimensional vectors, which do not change with a change of color gamut. As described above, the information of color gamut range of the original image data of each pixel in the frame of the image to be displayed is known or knowable. That is, the color coordinates $(x_r, y_r, Y_r)$, $(x_g, y_g, Y_g)$ and $(x_b, y_b, Y_b)$ of the three primary-color light $r_0$, $g_0$, $b_0$ of the color gamut range to which the original image data of one pixel in the frame of the image to be displayed belongs in xyY coordinates are known or knowable.

Furthermore, tristimulus values X, Y and Z of a pixel is calculated according to the original image data $r_s$, $g_s$, and $b_s$ of a pixel in the frame of the image to be displayed, in Formula 2:

$$\begin{bmatrix} X \\ Y \\ Z \end{bmatrix} = C \begin{bmatrix} r_s \\ g_s \\ b_s \end{bmatrix}.$$ (Formula 2)

A color conversion matrix C of the color gamut to which the image to be displayed belongs corresponds to the information of color gamut corresponding to the original image data, which is the conversion matrix needed to calculate the corresponding tristimulus values X, Y and Z according to the original image data of the pixel and the information of color gamut range to which it belongs. The color conversion matrix C conforms to the following Formula 3:

$$C = \begin{bmatrix} \frac{x_r}{y_r} Y_r & \frac{x_g}{y_g} Y_g & \frac{x_b}{y_b} Y_b \\ Y_r & Y_g & Y_b \\ \frac{1-x_r-y_r}{y_r} Y_r & \frac{1-x_g-y_g}{y_g} Y_g & \frac{1-x_b-y_b}{y_b} Y_b \end{bmatrix}.$$ (Formula 3)

According to Formula 3, the color conversion matrix C is determined by the color coordinates $(x_r, y_r, Y_r)$, $(x_g, y_g, Y_g)$ and $(x_b, y_b, Y_b)$ of the three primary-color light $r_0$, $g_0$ and $b_0$ of a color gamut range in the xyY coordinates, where the three primary color original image data of the pixel belong to the color gamut range. Specifically, in an embodiment, the information of color gamut range, on which the original image data of the frame of the image to be displayed are based, may include a color conversion matrix C. That is, in addition to the three primary color original image data, the original image data of the frame of the image to be displayed may store the color conversion matrix C, as information of color gamut range on which the original image data of the frame of the image to be displayed are based. However, in a modified embodiment, the information of color gamut range, on which the original image data of the frame of the image to be displayed are based, can also be information of color coordinates $(x_r, y_r, Y_r)$, $(x_b, y_b, Y_b)$ and $(x_b, y_b, Y_b)$ of the three primary-color light $r_0$, $g_0$, $b_0$; or specific characters or codes representing the information of color gamut range, which will not be limited thereto.

Furthermore, according to the above Formulas 1, 2 and 3, it can be known that the tristimulus values X, Y and Z of the pixel can be calculated and obtained according to the three primary color original image data $r_s$, $g_s$ and $b_s$ of the pixel and the information of color gamut range to which the three primary color original image data belong, that is, the color coordinates $(x_r, y_r, Y_r)$, $(x_g, y_g, Y_g)$ and $(x_b, y_b, Y_b)$ of the three primary-color light $r_0$, $g_0$ and $b_0$.

A color conversion matrix C' based on the first to fifth primary-color light and a color conversion matrix C'' of the display device 10 are stored into the display device 10. The color conversion matrix C' based on the first to fifth primary-color light is related to coordinate values of the first to fifth primary-color light in the xyY coordinate system. The color conversion matrix C'' of the display device 10 is related to a default color gamut range of the output image of the display device 10, which is adaptive to a color gamut range of the light emitted from the light source system 100. The color conversion matrix C' and the color conversion matrix C'' can be the same or different.

Color coordinates of five primary-color light $r_0'$, $g_0'$, $b_0'$, $rl_0'$ and $gl_0'$ provided by the light source system 100 to the light modulation device 700 are $(x_r', y_r', Y_r')$, $(x_g', y_g', Y_g')$, $(x_b', y_g', Y_g')$, $(x_{rl}', y_{rl}', Y_{rl}')$ and $(x_{gl}', y_{gl}', Y_{gl}')$ respectively. It can be understood that when fixed primary-color light is emitted by the light source system 100 of the display device 10, the color gamut range of the image modulated by the corrected image data is also known, that is, the color gamut range that can be displayed by the primary-color light emitted by the light source system 10. The color coordinates $(x_r', y_r', Y_r')$, $(x_g', y_g', Y_g')$, $(x_b', y_g', Y_g')$, $(x_{rl}', y_{rl}', Y_{rl}')$, $(x_{rl}', y_{rl}', Y_{rl}')$ and $(x_{gl}', y_{gl}', Y_{gl}')$ of the primary-color light $r_0'$, $g_0'$, $b_0'$, $rl_0'$ and $gl_0'$ can be obtained by measuring the color gamut range of the primary-color light emitted from the light source system 100.

The display device 10 store a color gamut conversion matrix U' corresponding to the color gamut ranges of five primary-color light. The control device 800 converts the received three primary-color light original image data into corrected image data based on the first primary-color light to the fifth primary-color light, by using the color gamut conversion matrix U'. Under the condition that the light source system 100 emits fixed primary-color light, the color gamut conversion matrix U' of the display device 10 is also fixed. For example, the color gamut conversion matrix U' can be pre-stored in a manufacturing process of the display device 10. Thus, the display device 10 can generate corrected image data by the color gamut conversion matrix U' in a normal operation. Further, the color coordinates $(x_r', y_r', Y_r')$, $(x_g', y_g', Y_g')$, $(x_b', y_g', Y_g')$, $(x_{rl}', y_{rl}', Y_{rl}')$ and $(x_{gl}', y_{gl}',$ $Y_{gl}'$) of the five primary-color light $r_0'$, $g_0'$, $b_0'$, $rl_0'$ and $gl_0'$ of the light source system 100 can be obtained by using the following Formula 4:

$$\begin{bmatrix} r_0' \\ g_0' \\ b_0' \\ rl_0' \\ gl_0' \end{bmatrix} = \begin{bmatrix} x_r' & y_r' & Y_r' \\ x_g' & y_g' & Y_g' \\ x_b' & y_b' & Y_b' \\ x_{rl}' & y_{rl}' & Y_{rl}' \\ x_{gl}' & y_{gl}' & Y_{gl}' \end{bmatrix}. \quad \text{(Formula 4)}$$

Further, the display device 10 calculates the tristimulus values X, Y, Z of the pixel according to the corrected image data based on the first to fifth primary-color light, as shown in Formula 5:

$$\begin{bmatrix} X \\ Y \\ Z \end{bmatrix} = C' \begin{bmatrix} r' \\ g' \\ b' \\ rl' \\ gl' \end{bmatrix}. \quad \text{(Formula 5)}$$

In Formula 5, r', g', b', rl', gl' are first primary-color data to fifth primary-color data included in the corrected image data and corresponding to each primary-color light. Specifically, r', g', b', rl', gl' are gray values of the first primary-color light to the fifth primary-color light of a color gamut range corresponding to the corrected image data, respectively. A color conversion matrix C' based on the first primary-color light to the fifth primary-color light is required for calculating corresponding tristimulus values X, Y and Z according to the corrected image data of any pixel, which conforms to following Formula 6:

$$C' = \begin{bmatrix} \frac{x_r'}{y_r'} Y_r' & \frac{x_g'}{y_g'} Y_g' & \frac{x_b'}{y_b'} Y_b' & \frac{x_{rl}'}{y_{rl}'} Y_{rl}' & \frac{x_{gl}'}{y_{gl}'} Y_{gl}' \\ Y_r' & Y_g' & Y_b' & Y_{rl}' & Y_{gl}' \\ \frac{1-x_r'-y_r'}{y_r'} Y_r' & \frac{1-x_g'-y_g'}{y_g'} Y_g' & \frac{1-x_b'-y_b'}{y_b'} Y_b' & \frac{1-x_{rl}'-y_{rl}'}{y_{rl}'} Y_{rl}' & \frac{1-x_{gl}'-y_{gl}'}{y_{gl}'} Y_{gl}' \end{bmatrix}. \quad \text{(Formula 6)}$$

It can be known from Formula 6 that the color conversion matrix C' is determined by the color gamut range of the image formed by the five primary-color light emitted by the light source system 100, that is, by the color coordinates of the five primary-color light emitted by the light source system 100. The tristimulus values X, Y and Z of any pixel remain unchanged regardless of the color gamut range corresponding to the original image data of this pixel. Thus, according to the above Formulas 1-6, a relationship between original image data $r_s$, $g_s$ and $b_s$ based on three primary colors for any pixel and corrected image data r', g', b', rl' and gl' based on the first primary-color light to fifth primary-color light of the display device 10 satisfies following formula 7:

$$\begin{bmatrix} r' \\ g' \\ b' \\ rl' \\ gl' \end{bmatrix} = C'^{-1} C \begin{bmatrix} r_s \\ g_s \\ b_s \end{bmatrix}. \quad \text{(Formula 7)}$$

According to the above description, a display device needs to convert the original image data (e.g., three primary-color original image data $r_s$, $g_s$, $b_s$) received by the light modulation device 700 into the corrected image data r', g', b', rl', gl'. The light modulation device 700 further calculates first modulation data for applying the adjustment signal in the first period and the second modulation data for applying the adjustment signal in the second period, according to the correction image data r', g', b', rl' and gl'. The light modulation device 700 modulates the light of light source emitted by the light source system 100, according to the first modulation data and the second modulation data, so as to accurately generate image light. It can be seen from this that the color gamut conversion matrix U' satisfies following Formula 8, where the color gamut conversion matrix U' is stored in the control device 800 and is used to convert the received original image data of any pixel into corrected image data.

$$U'=C'^{-1}C \quad \text{(Formula 8).}$$

According to the above Formulas 7 to 8, the control device 800 can calculate the corrected image data of each pixel in the image to be displayed, according to the original image data based on three primary colors of each pixel in the image to be displayed, the color conversion matrix C of the color gamut of the image to be displayed, and the color conversion matrix C' based on the first primary-color light to the fifth primary-color light. After the original image data $r_s$, $g_s$ and $b_s$ are input to the control device 800, the control device 800 can calculate and obtain the first primary-color data to the fifth primary-color data r', g', b', rl' and gl' in the corrected image data according to the color gamut conversion matrix U'.

In Formula 7, the three primary-color original image data $r_s$, $g_s$, $b_s$ of any pixel in the frame of the image to be displayed are known, and corresponding corrected image data r', g', b', rl', gl' are solved. Because there are only three Formulas to solve five unknown data, infinite solutions can be obtained. In an embodiment, two modulated data are randomly assigned, and the other three modulated data are calculated. Generally, the five modulated data all has a value range between 0 and 1. The randomly selected two values may make the other three values beyond the value range. Thus, the method for randomly selecting the values is not a good solution. In another embodiment, each primary-color data in the corrected image data is solved by adding a preset condition. For example, the preset condition is: the sum of squares of brightness of the fourth primary-color light and brightness of the fifth primary-color light has the minimum.

That is, min(rl'²+gl'²) is solved, to obtain the corrected image data r', g', b', rl' and gl' based on the five primary-color light. Formula 5 is converted into:

$$A \begin{bmatrix} r' \\ g' \\ b' \\ 1 \end{bmatrix} = B \begin{bmatrix} rl' \\ gl' \end{bmatrix}. \quad \text{(Formula 9)}$$

Where $$A = \begin{bmatrix} \frac{x'_r}{y'_r} Y'_r & \frac{x'_g}{y'_g} Y'_g & \frac{x'_b}{y'_b} Y'_b & X \\ Y'_r & Y'_g & Y'_b & Y \\ \frac{1-x'_r-y'_r}{y'_r} Y'_r & \frac{1-x'_g-y'_g}{y'_g} Y'_g & \frac{1-x'_b-y'_b}{y'_b} Y'_b & Z \end{bmatrix}, \text{ and} \quad \text{(Formula 10)}$$

$$B = \begin{bmatrix} \frac{x'_{rl}}{y'_{rl}} Y'_{rl} & \frac{x'_{gl}}{y'_{gl}} Y'_{gl} \\ Y'_{rl} & Y'_{gl} \\ \frac{1-x'_{rl}-y'_{rl}}{y'_{rl}} Y'_{rl} & \frac{1-x'_{gl}-y'_{gl}}{y'_{gl}} Y'_{gl} \end{bmatrix}. \quad \text{(Formula 11)}$$

The matrices A and B are determined by the color coordinates of five primary-color light and tristimulus values X, Y and Z of corresponding pixels. In the matrices A and B, the color coordinates of five primary-color light are known or knowable, and the tristimulus values X, Y and Z of corresponding pixels can be obtained by formula 2. That is, both matrices A and B can be obtained by calculation.

Formulas 10-11 are substituted into Formula 9 to obtain Formula 12:

$$\begin{bmatrix} rl' \\ gl' \end{bmatrix} = (B^T B)^{-1} B^T A \begin{bmatrix} r' \\ g' \\ b' \\ 1 \end{bmatrix} = T \begin{bmatrix} r' \\ g' \\ b' \\ 1 \end{bmatrix}. \quad \text{(Formula 12)}$$

Where $$T = (B^T B)^{-1} B^T A = \begin{bmatrix} t_{11} & t_{12} & t_{13} & t_{14} \\ t_{21} & t_{22} & t_{23} & t_{24} \end{bmatrix}, \quad \text{(Formula 13)}$$

$t_{11}$, $t_{12}$, $t_{13}$, $t_{14}$, $t_{21}$, $t_{22}$, $t_{23}$ and $t_{24}$ can all be calculated according to the matrices A and B.

In order solve min(rl'²+gl'²), the following function is defined:

$$f(rl', gl') = \left\| \begin{matrix} rl' \\ gl' \end{matrix} \right\|^2,$$

The formula 12 is substituted into the function $f(rl', gl')$. When the function $f(rl', gl')$ gets the minimum value, the condition $\nabla f = 0$ is satisfied.

Thereby, Formula 14 is obtained:

$$\begin{bmatrix} r' \\ g' \\ b' \end{bmatrix} = D^{-1} d. \quad \text{(Formula 14)}$$

-continued

Where $$D = \begin{bmatrix} t_{11}^2 + t_{21}^2 & t_{11} t_{12} + t_{21} t_{22} & t_{11} t_{13} + t_{21} t_{23} \\ t_{12} t_{11} + t_{22} t_{21} & t_{12}^2 + t_{22}^2 & t_{12} t_{13} + t_{22} t_{23} \\ t_{13} t_{11} + t_{23} t_{21} & t_{13} t_{12} + t_{23} t_{22} & t_{33}^2 + t_{23}^2 \end{bmatrix}, \text{ and}$$

$$d = \begin{bmatrix} t_{11} t_{14} + t_{21} t_{24} \\ t_{11} t_{14} + t_{21} t_{24} \\ t_{11} t_{14} + t_{21} t_{24} \end{bmatrix}.$$

As both matrices D and d can be calculated from the elements in a matrix T; and r', g', b', rl' and gl' can be obtained according to Formula 12 and Formula 14.

It can be understood that in a modified embodiment, the five primary-color data in the corrected image data can be solved by adding other preset conditions. To expand the color gamut of the display device 10, the preset condition may be that the sum of squares of the brightness of the first primary-color light and the brightness of the second primary-color light is minimized, or the sum of squares of the brightness of the fourth primary-color light and the brightness of the fifth primary-color light is maximized. In order to improve the brightness of the display device 10, the preset condition may be that the sum of squares of the brightness of the first primary-color light and the brightness of the second primary-color light has the maximum.

The control device 800 calculates the first modulation data in the first time period and the second modulation data in the second time period, for each pixel in the image to be displayed, according to the corrected image data of each pixel in the image to be displayed, the color conversion matrix C" of the display device 10 and the color conversion matrix C' corresponding to the color gamut range of the corrected image data.

Specifically, in the first time period, the light source system 100 emits the first light. The first light includes the first primary-color light, the second primary-color light and the third primary-color light, which are emitted in sequence. Thus, the light modulation device 7M) modulates the first light by using the modulation data $r^{odd}$, $g^{odd}$ and $b^{odd}$ in the first modulation data. The modulation data $r^{odd}$, $g^{odd}$ and $b^{odd}$ are respectively used for modulating the first primary-color light, the second primary-color light and the third primary-color light. The color conversion matrix C' is determined by the color coordinates of the five primary-color light in the color gamut range of the corrected image data in the xyY coordinate system.

In the first time period, the light modulation device 700 is configured to modulate the first primary-color light, the second primary-color light and the third primary-color light by using elements $r^{odd}$, $g^{odd}$ and $b^{odd}$ in the first modulation data. The control device 800 calculates the first modulation data, according to the first primary-color data r' in the corrected image data of a corresponding pixel, the second primary-color data g' in the corrected image data of the corresponding pixel, the third primary-color data b' in the corrected image data of the corresponding pixel, the color conversion matrix C" of the display device and the color conversion matrix C' corresponding to the color gamut range of the corrected image data, which conforms to Formula 16:

$$\begin{bmatrix} r^{odd} \\ g^{odd} \\ b^{odd} \end{bmatrix} = C'^{-1} C'' \begin{bmatrix} r' \\ g' \\ b' \end{bmatrix}. \qquad \text{(Formula 16)}$$

In the second time period, the light source system 100 emits the second light. The second light includes the fourth primary-color light and the fifth primary-color light, which are emitted in time sequence. Thus, the light modulation device 700 modulates the second light by using elements $r^{even}$, $g^{even}$ and $b^{even}$ in the second modulation data accordingly.

In the second time period, the control device 800 calculates the second modulation data according to the fourth primary-color data rl' in the corrected image data of a corresponding pixel, the fifth primary-color data gl' in the corrected image data of the corresponding pixel, the color conversion matrix C" of the display device 10 and the color conversion matrix C' corresponding to the color gamut range of the corrected image data, which conforms to Formula 17:

$$\begin{bmatrix} r^{even} \\ g^{even} \\ b^{even} \end{bmatrix} = C'^{-1} C'' \begin{bmatrix} rl' \\ gl' \\ 0 \end{bmatrix}. \qquad \text{(Formula 17)}$$

In this embodiment, the third section B2 of the filter unit 155 of the color wheel 150 does not emit light in the second time period. In another embodiment, in order to improve the efficiency and brightness of the light source system 100, the third section B2 of the color wheel 150 may be illuminated by at least one of the third primary-color light and/or the fourth primary-color light and/or the fifth primary-color light, to improve utilization efficiency of the light source system 100. Next, an illustration will be made by taking the third section B2 be illuminated with the fifth primary-color light emitted by the green light emitting body 122 of the second light source 120 in the second time period as an example.

Under the control of the light source control signal, the light source system 100 emits the first primary-color light to the fifth primary-color light to the light modulation device 700 in the first sub-period to the fifth sub-period, and emits the fifth primary-color light in the sixth sub-period, wherein a ratio of time lengths of the fifth sub-period to the sixth sub-period is m:n. The measured color coordinates of the fifth primary-color light are ($x_{gl}$, $y_{gl}$, $Y_{gl}$), then the color coordinates of the green laser light emitted from the second segment G2 is $$\left( x_{gl}, y_{gl}, \frac{m}{m+n} Y_{gl} \right),$$

and the color coordinates of the green laser light emitted from the third section B2 is $$\left( x_{gl}, y_{gl}, \frac{m}{m+n} Y_{gl} \right).$$

It should be noted that the ratio of the time lengths of the fifth sub-period to the sixth sub-period is a ratio of a central angle formed by the second segment G2 of the filter unit 155 with the geometric center of the substrate 151 to a central angle formed by the third section B2 of the filter unit 155 with the geometric center of the substrate 151, which is also a ratio of a central angle formed by the second segment G1 of the conversion portion 152 with the geometric center of the substrate 151 to a ratio of a central angle formed by the third section B1 of the conversion portion 152 with the geometric center of the substrate 151. In a case that the periodic movement speed of the color wheel 150 is constant, the larger the central angles corresponding to the third section B1 and the third section B2, the longer the sixth sub-period is.

In this embodiment, the corrected image data r', g', b', rl', gl' of the corresponding pixel can be calculated according to Formula 7. In the first time period, the first modulated data and the output image signal of the display device 10 are the same as those in the previous embodiment, which conform to Formula 16.

In the second time period, the light source system 100 emits second light. Specifically, in the fourth sub-period, the fifth sub-period and the sixth sub-period, the light source system 100 sequentially emits the fourth primary-color light, the fifth primary-color light and the fifth primary-color light, respectively.

The light modulation device 700 modulates the second light by using the elements $r^{even}$, $g^{even}$, $b^{even}$ in the second modulation data.

In the second time period, the control device 800 calculates the second modulation data, according to the fourth primary-color data rl' in the corrected image data, the fifth primary-color data gl' in the corrected image data, a ratio of time lengths of the fifth sub-period to the sixth sub-period, the color conversion matrix C" of the display device 10, and the color conversion matrix C' corresponding to the color gamut information of the corrected image data, which conforms to Formula 18:

$$\begin{bmatrix} r^{even} \\ g^{even} \\ b^{even} \end{bmatrix} = C'^{-1} C'' \begin{bmatrix} rl' \\ gl'_1 \\ gl'_2 \end{bmatrix}. \qquad \text{(Formula 18)}$$

In Formula 18, $$gl'_1 = \frac{m}{m+n} gl', \; gl'_2 = \frac{m}{m+n} gl'.$$

Since the fifth primary-color data gl' has been obtained according to Formula 7, $gl_1'$ and $gl_2'$ can also be calculated.

It can be understood that in other embodiments, the light source emits the third primary-color light and/or the fourth primary-color light and/or the fifth primary-color light in the second time period. The control device 800 calculates the second modulation data, according to the fourth primary-color data rl' in the corrected image data, the fifth primary color data gl' in the corrected image data, a ratio of time lengths of the third sub-period and/or the fourth sub-period and/or the fifth sub-period to the sixth sub-period, the color conversion matrix C" of the display device 10 and the color conversion matrix C' corresponding to the color gamut information of the corrected image data.

Therefore, the third section B2 of the filter unit 155 can be illuminated with any primary-color light, according to the corrected image data r', g', b', rl', gl' of the pixel in the frame of the image to be displayed and a ratio of time lengths of the fifth sub-period to the sixth sub-period, thereby improving the brightness of the output image light and improving the light efficiency of the light source system 100.

In addition, ratio configurations of intensities of the third primary-color light, the fourth primary-color light and the fifth primary-color light emitted by the first light source 110 and the second light source 120 need to be satisfied. The display device 10 can synthesize white light when input original image data corresponds to white light. Under the principle that the sum of squares of brightness of the fourth primary-color light and brightness of the fifth primary-color light has the minimum, the intensities of the fourth primary-color light and the fifth primary-color light are always zero when the input original image data correspond to white light. Therefore, in order to maintain the white balance, the display device 10 only needs to ensure a relative ratio of the first primary-color light, the second primary-color light and the third primary-color light. That can be realized by adjusting a ratio of an angle formed by the first segment R1 in the conversion portion 152 of the color wheel 150 and the geometric center of the substrate 151, an angle formed by the second segment G1 and the geometric center of the substrate 151, and an angle formed by the third section B1 and the geometric center of the substrate 151. The brightness of the fourth primary-color light and the fifth primary-color light, which are mixed in the first primary-color light, the second primary-color light and the third primary-color light, can be determined according to brightness distribution of pure red and green light in the display content.

Figure 4:
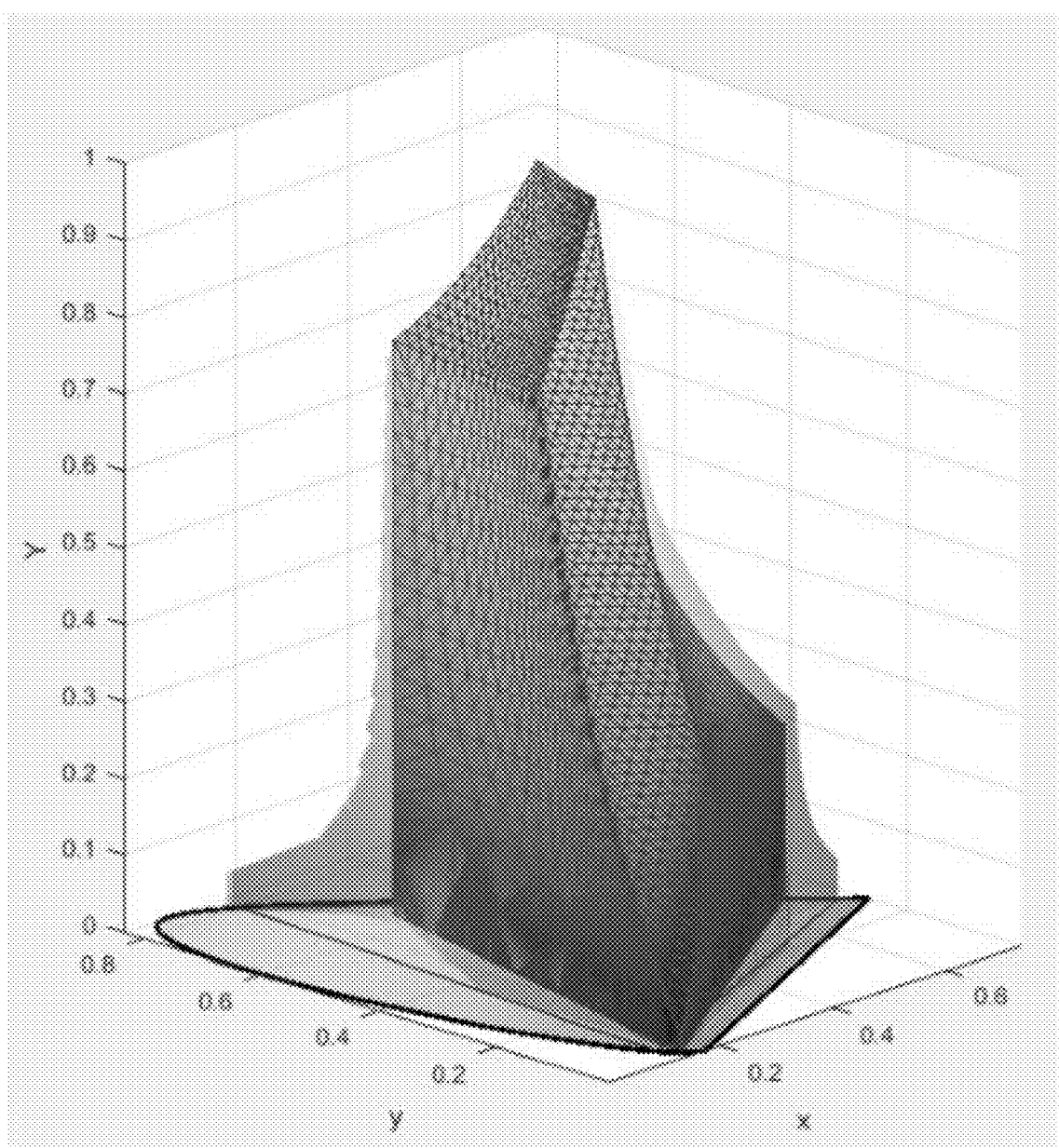
FIG. 4 is a schematic diagram showing an expansion of a color gamut and a color volume of an emitted image of a display device in an embodiment of the present disclosure.

FIG. 4 shows a schematic diagram for expanding a color gamut and a color volume of the output image of the display device 10 according to an embodiment of the present disclosure. In FIG. 4, an xoy plane surface represents the color gamut range of the output image of the display device 10, and a Y axis represents the brightness corresponding to each color coordinate. In FIG. 4, a solid part in a middle is the first color gamut range, and a transparent part in a periphery is a part where the second color gamut range exceeds the first color gamut range. The display brightness of the display device 10 is mainly determined by the first light in the first color gamut range, and the brightness of the second light is smaller than that of the first light. Theoretically, it is feasible that the brightness of the fourth primary-color light and the brightness of the fifth primary-color light are 5% to 100% of the brightness of the third primary-color light. Generally, the requirement of a general display color gamut can be met by adding the fourth and fifth primary-color light with a brightness equal to 5%-40% of the brightness of the third primary-color light. In addition, after the first image light and the second image light are superimposed, the color gamut range of the display device 10 is obviously expanded, so as to improve the display quality of the display device 10.

A method for controlling a display device is provided according to an embodiment of the present disclosure, which is applied to the control device 800 of the display device 10. The method includes following steps:

In S1, a display period of each frame of an image to be displayed is divided into a first time period and a second time period according to original image data of each frame of the image to be displayed; and a light source control signal, and first modulation data applied to the first time period, and second modulation data applied to the second time period are generated.

In an embodiment, the control device 800 divides the display period of each frame of the image to be displayed into the first time period and the second time period with equal duration. It can be understood that, in order to improve a brightness of emitted light of the display device 10, a duration of the first time period can be longer than that of the second time period, to increase the proportion of the emitted first and second primary-color light emitted by the light source system 100. In order to improve purity of the emitted light, the duration of the first time period can be set to be shorter than that of the second time period, to increase the proportion of the fourth and the fifth primary-color light emitted by the light source system 100. In an embodiment in which the light source system to includes a periodically movable color wheel 150. In the first time period and the second time period, the color wheel 150 moves in an integer number of cycles respectively.

In an embodiment, the first time period is divided into a first sub-period for displaying the first primary-color light, a second sub-period for displaying the second primary-color light, and a third sub-period for displaying the third primary-color light, according to the original image data of each frame of images to be displayed. The second time period is divided into a fourth sub-period for displaying the fourth primary-color light, a fifth sub-period for displaying the fifth primary-color light, and a sixth sub-period in which no light is emitted, according to the original image data of each frame of the image to be displayed.

The control device 800 divides the first time period into a first sub-period for modulating the first primary-color light, a second sub-period for modulating the second primary-color light, and a third sub-period for modulating the third primary-color light, according to the original image data of each frame of the image to be displayed. The control device 800 is further configured to divide the second time period into a fourth sub-period for modulating the fourth primary-color light, a fifth sub-period for modulating the fifth primary-color light, and a sixth sub-period in which no light is emitted.

In an embodiment, according to the original image data of the image to be displayed in each frame, the second time period is divided into a fourth sub-period for displaying the fourth primary-color light, a fifth sub-period for displaying the fifth primary-color light, and a sixth sub-period for displaying the third primary-color light and/or the fourth primary-color light and/or the fifth primary-color light and/or other primary-color light, so as to improve the brightness of emitted light of the display device 10.

On the other hand, corrected image data based on the first primary-color light to the fifth primary-color light are calculated and obtained, according to three primary-color original image data of each pixel in the image to be displayed, the color conversion matrix C" based on the first primary-color light to the fifth primary-color light, the color conversion matrix C of the color gamut of the image to be displayed, and preset condition. The corrected image data includes first primary color data to fifth primary color data corresponding to the first primary-color light to the fifth primary-color light, respectively.

Specifically, the original image data of each pixel of the image to be displayed includes three primary-color original image data of the pixel and the color gamut range to which the three primary-color original image data belongs. In an embodiment, the original image data of each pixel includes a color conversion matrix C. Alternatively, the original image data of each pixel includes the color coordinates of the three primary-color light of the color gamut to which each pixel belongs; and the color conversion matrix C can be calculated by using the color coordinates of the three primary-color light of the color gamut to which each pixel belongs according to Formula 3.

For the display device 10, the color gamut range based on the first primary-color light to the fifth primary-color light is determined by the color coordinates of the five primary-color light emitted by the light source system 100 in the xyY coordinate system. In addition, when the primary-color light emitted by the light source system 100 is fixed, the color coordinates of the primary-color light emitted by the light source system 100 can be measured. According to Formula 6, the color conversion matrix C'' can be calculated, where the color conversion matrix C' is used to calculate the tristimulus value of the corresponding pixel by using the corrected image data in the corresponding color gamut range of the first primary-color light to the fifth primary-color light. Furthermore, according to Formula 7, the corrected image data r', g', b', rl' and gl' based on the color gamut range to which the first to fifth primary-color light belong can be calculated from the original image data of any pixel.

For the display device 10 that does not perform light modulation in the sixth sub-period, the first modulation data applied to the light modulation device 7M) in the first time period and the second modulation data applied to the light modulation device 700 in the second time period can respectively be calculated by Formulas 16 and 17, according to the calculated corrected image data r', g' b', rl' and gl', the color conversion matrix C' corresponding to the color gamut range of the corrected image data, and the color conversion matrix C'' of the display device 10.

In an embodiment that the third primary-color light and/or the fourth primary-color light and/or the fifth primary-color light are emitted in the sixth period, the first modulation data of the display device 10 in the first period and the second modulation data of the display device 10 in the second period are calculated as shown in Formulas 16 and 18, according to the calculated corrected image data r', g', b', rl' and gl', the color conversion matrix C' of the color gamut corresponding to the corrected image data, the color conversion matrix C'' of the display device 10, a ratio of durations of the third sub-period and/or the fourth sub-period and/or the fifth sub-period to the sixth sub-period.

The preset condition includes: a constraint condition that the sum of squares of brightness of the fourth primary-color light and brightness of the fifth primary-color light has the minimum or the maximum, or a constraint condition that the sum of squares of brightness of the first primary-color light and brightness of the second primary-color light has the minimum or the maximum.

In S2, the light source system 100 is controlled to emit first light including three primary-color components in a first time period, according to the light source control signal; and the light source system 100 is controlled to emit second light including laser light in a second time period, according to the light source control signal.

In this embodiment, step S2 specifically includes: controlling the light source system 100 to emit the first light including the first primary-color light, the second primary-color light and the third primary-color light in the first time period according to the light source control signal; and controlling the light source system 100 to emit laser light including the fourth primary-color light and the fifth primary-color light in the second time period.

Further, according to the light source control signal, the light source system is controlled to correspondingly emit the first primary-color light to the fifth primary-color light in the first sub-period to the fifth sub-period, and the light source system is controlled not to emit light in the sixth sub-period.

The control device 800 is configured to emit a light source control signal, and the light source system 100 emits the first light according to the light source control signal. The light source system 100 includes a first light source 110, a second light source 120 and a color wheel 150. The first light is generated by using light emitted from the first light source 110 to excite the color wheel 150. The first light includes the first primary-color light, the second primary-color light and the third primary-color light. In an embodiment of the present disclosure, excitation light emitted by the first light source 110 is blue laser light, the first primary-color light is red fluorescent light, the second primary-color light is green fluorescent light, and the third primary-color light is scattered blue laser light. Because the fluorescent light has a wide spectrum coverage and a low color purity, the color gamut range of the image in the first color gamut range modulated by fluorescent light is small. In other embodiments, the excitation light can also be other color light with a short wavelength. The third primary-color light can be blue fluorescent light. In addition, the first light may also include yellow fluorescent light and scattered blue laser light. In an embodiment of the present disclosure, the second light includes a fourth primary-color light and a fifth primary-color light. The fourth primary-color light is red laser light emitted by a red light emitting body 121 in the second light source 120, and the fifth primary-color light is green laser light emitted by a green light emitting body 122 in the second light source 120.

The laser light included in the second light and at least part of the primary-color light in the first light are metameric light. In this embodiment, the fourth primary-color light and the first primary-color light are metameric light, and the fifth primary-color light and the second primary-color light are metameric light. The fourth primary-color light and the fifth primary-color light are both laser light, and the emitted light has high color purity. The second color gamut range to which the image light modulated by the laser light belongs is wider than the first color gamut range. Compared with the first color gamut range, the second color gamut range covers the first color gamut range and has a part beyond the first color gamut range.

The control device 800 controls respective primary-color light to be emitted in time sequence. The light source system 100 is configured to correspondingly emit the first primary-color light to the fifth primary-color light in the first sub-period to the fifth sub-period, and does not emit light in the sixth sub-period, according to the light source control signal sent by the control device 800.

In an embodiment, according to the light source control signal, the light source system is controlled to correspondingly emit the first primary-color light to the fifth primary-color light in the first sub-period to the fifth sub-period, and to emit the third primary-color light and/or the fourth primary-color light and/or the fifth primary-color light and/or other primary-color light in the sixth sub-period, so as to improve the brightness of emitted light of the display device 10.

S3, the first light is modulated according to the first modulation data to generate first image light of an image to be displayed, and the second light is modulated according to the second modulation data to generate second image light of an image to be displayed.

The light modulation device 700 is configured to modulate the light emitted by the light source system 100 in a time-division manner according to the first modulation data and the second modulation data in the modulation signal.

It can be understood that the above step numbers S1-S3 are not used to define the order of steps, and some steps can be added or deleted between steps.

A control device 800 of the display device 10 may include a DMD Data Processor (DDP), a Central Processing Unit (CPU), other general-purpose processors, a Digital Signal Processor (DSP), Application Specific Integrated Circuit (ASIC), Field-Programmable Gate Array (FPGA) or other programmable logic devices, discrete gate or transistor logic devices, discrete hardware components, etc. The general-purpose processor can be a microprocessor or any conventional processor, etc. The control device 800 is the control center of the display device 10, which connects the light source system 100 and the light modulation device 700 of the display device 10 through various interfaces and lines, and sends a light source control signal for controlling the light source system 100 and a modulation signal for controlling the light modulation device 700 respectively.

The display device 10 may also include a nonvolatile computer-readable storage device, which can be used to store programs and/or modules of the display device 10. The control device 800 implements steps of the method for controlling the display device and corresponding functions of the display device by running or executing computer programs and/or modules stored in the storage device and calling data and formulas stored in the storage device. The nonvolatile computer readable storage device can mainly include a storage program area and a storage data area, wherein the storage program area can store an operating system, an application program required by at least one function, and the like. The storage data area may store data, formulas and the like created according to a usage of the display device 10. In addition, the storage device may include high-speed random access storage devices, and may also include nonvolatile storage devices, such as hard disks, memory, plug-in hard disks, Smart Media Card (SMC), Secure Digital (SD) cards, Flash Card, at least one magnetic-disk storage device, flash memory devices, or other volatile solid-state storage devices.

A method for controlling the display device and a nonvolatile computer-readable storage device are provided according to the embodiments of the present disclosure. The display device 10 divides a display period of an image to be displayed into a first time period and a second time period, and controls a light source system 100 to emit first light in the first time period and emit second light in the second time period. Under the control of a control device 800, a light modulation device 700 modulates the first light and the second light respectively. The first image light emitted in the first time period and the second image light emitted in the second time period are superimposed by using the persistence effect of human eyes. Since the laser light in the second light and at least part of the first light are metameric light, the first image light and the second image light belong to different color gamut ranges. In this way, the emitted image of the display device 10 has an expanded color gamut range.

It is obvious to those skilled in the art that the present disclosure is not limited to the details of the above exemplary embodiments, and that the present disclosure can be realized in other specific forms without departing from the spirit or basic characteristics of the present disclosure. Therefore, the embodiments shall be regarded as exemplary and non-limiting from any point of view, and the scope of the present disclosure is defined by the appended claims instead of the above description, so it is intended to embrace all changes that fall within the meaning and range of equivalent elements of the claims. Any reference signs in the claims should not be regarded as limiting the claims involved. In addition, obviously, the word "including" does not exclude other units or steps, and the singular does not exclude the plural. A plurality of devices recited in the device claims can also be realized by the same device or system by software or hardware. The first and second words are used to indicate names, but do not indicate any particular order.

Finally, it should be noted that the above embodiments are only used to illustrate the technical solution of the present disclosure, but not to limit the present disclosure. Although the present disclosure has been described in detail with reference to the preferred embodiments, those of ordinary skill in the art should understand that the technical solution of the present disclosure can be modified or equivalently replaced without departing from the spirit and scope of the technical solution of the present disclosure.

What is claimed is:

1. A display device, comprising:
   a control device configured to divide a display period of each frame of an image to be displayed into a first time period and a second time period; and send a light source control signal and a modulation signal corresponding to each pixel in the image to be displayed, according to original image data of each frame of the image to be displayed;
   a light source system configured to emit light of light source according to the light source control signal, wherein the light of light source comprises:
      first light comprising three primary-color components and emitted in the first time period; and
      second light comprising laser light and emitted in the second time period, wherein the laser light comprised in the second light and at least part of primary-color light in the first light are metameric light; and
   a light modulation device configured to modulate the first light according to the modulation signal to generate first image light of the image to be displayed, and modulate the second light according to the modulation signal to generate second image light of the image to be displayed.

2. The display device according to claim 1, wherein the first light comprises first primary-color light, second primary-color light and third primary-color light; and the second light comprises fourth primary-color light and fifth primary-color light, wherein the first primary-color light and the fourth primary-color light are metameric light, the second primary-color light and the fifth primary-color light are metameric light, and the light modulation device modulates the first primary-color light to the fifth primary-color light according to the modulation signal.

3. The display device according to claim 2, wherein
   the first time period comprises a first sub-period for displaying the first primary-color light, a second sub-period for displaying the second primary-color light, and a third sub-period for displaying the third primary-color light;
   the second time period comprises a fourth sub-period for displaying the fourth primary-color light and a fifth sub-period for displaying the fifth primary-color light, and the second time period further comprises a sixth sub-period in which no light is emitted; and
   the light source system emits the first primary-color light to the fifth primary-color light respectively in the first sub-period to the fifth sub-period according to the light source control signal, and the light source system does not emit light in the sixth sub-period.

4. The display device according to claim 3, wherein the control device calculates corrected image data of the image to be displayed according to input original image data based on three primary colors, a color conversion matrix of a color gamut to which the image to be displayed belongs, a color conversion matrix based on the first primary-color light to the fifth primary-color light, and a preset condition;

the modulation signal comprises first modulation data applied to the first time period and second modulation data applied to the second time period; and the control device further calculates the first modulation data and the second modulation data based on the corrected image data, according to the corrected image data, a color conversion matrix of the color gamut corresponding to the corrected image data, and a color conversion matrix of the display device.

5. The display device according to claim 2, wherein the first time period comprises a first sub-period for displaying the first primary-color light, a second sub-period for displaying the second primary-color light, and a third sub-period for displaying the third primary-color light;

the second time period comprises a fourth sub-period for displaying the fourth primary-color light and a fifth sub-period for displaying the fifth primary-color light, and the second time period further comprises a sixth sub-period for displaying at least one of the third primary-color light, the fourth primary-color light and the fifth primary-color light; and the light source system emits the first primary-color light to the fifth primary-color light respectively in the first sub-period to the fifth sub-period according to the light source control signal, and the light source system emits at least one of the third primary-color light, the fourth primary-color light and the fifth primary-color light in the sixth sub-period.

6. The display device according to claim 5, wherein the control device calculates corrected image data of the image to be displayed according to input original image data based on three primary colors, a color conversion matrix of a color gamut to which the image to be displayed belongs, a color conversion matrix based on the first primary-color light to the fifth primary-color light, and a preset condition;

the modulation signal comprises first modulation data applied to the first time period and second modulation data applied to the second time period; and the control device further calculates the first modulation data based on the corrected image data, according to the corrected image data, a color conversion matrix of a color gamut corresponding to the corrected image data, and a color conversion matrix of the display device; and calculates the second modulation data based on the corrected image data, according to the corrected image data, the color conversion matrix of the color gamut corresponding to the corrected image data, the color conversion matrix of the display device, and a ratio of a duration of at least one of the third sub-period, the fourth sub-period and the fifth sub-period to a duration of the sixth sub-period.

7. The display device according to claim 4, wherein the preset condition comprises a constraint condition that a sum of squares of brightness of the fourth primary-color light and brightness of the fifth primary-color light has a minimum or a maximum; or a constraint condition that a sum of squares of brightness of the first primary-color light and brightness of the second primary-color light has a minimum or a maximum.

8. The display device according to claim 2, wherein the light source system comprises a first light source, a second light source, and a color wheel, wherein in response to the light source control signal, the first light source is configured to emit excitation light in the first time period; the color wheel is configured to convert the excitation light into the first primary-color light, the second primary-color light and the third primary-color light; and the second light source is configured to emit the fourth primary-color light and the fifth primary-color light in the second time period.

9. The display device according to claim 8, wherein the first primary-color light and the second primary-color light are red fluorescent light and green fluorescent light, respectively; the third primary-color light is blue laser light or blue fluorescent light; and the fourth primary-color light and the fifth primary-color light are red laser light and green laser light, respectively.

10. A method for controlling a display device, comprising:

dividing a display period of each frame of an image to be displayed into a first time period and a second time period; and generating a light source control signal, first modulation data applied to the first time period, and second modulation data applied to the second time period according to original image data of each frame of the image to be displayed;

controlling, according to the light source control signal, a light source system to emit first light comprising three primary-color components in the first time period and to emit second light comprising laser light in the second time period, wherein the laser light comprised in the second light and at least part of primary-color light in the first light are metameric light; and modulating the first light according to the first modulation data to generate first image light of the image to be displayed, and modulating the second light according to the second modulation data to generate second image light of the image to be displayed.

11. The method for controlling the display device according to claim 10, wherein the first light comprises red fluorescent light, green fluorescent light, and blue laser light or blue fluorescent light; and the second light comprises red laser light and green laser light.

12. A nonvolatile computer-readable storage medium having a computer program stored thereon, wherein the computer program, when executed by a processor, implements a method for controlling a display device, wherein the method comprises:

dividing a display period of each frame of an image to be displayed into a first time period and a second time period; and generating a light source control signal, first modulation data applied to the first time period, and second modulation data applied to the second time period according to original image data of each frame of the image to be displayed;

controlling, according to the light source control signal, a light source system to emit first light comprising three primary-color components in the first time period and to emit second light comprising laser light in the second time period, wherein the laser light comprised in the second light and at least part of primary-color light in the first light are metameric light; and modulating the first light according to the first modulation data to generate first image light of the image to be displayed, and modulating the second light according to the second modulation data to generate second image light of the image to be displayed.

13. The nonvolatile computer-readable storage medium according to claim 12, wherein the first light comprises red fluorescent light, green fluorescent light, and blue laser light or blue fluorescent light; and the second light comprises red laser light and green laser light.

14. The display device according to claim 6, wherein the preset condition comprises a constraint condition that a sum of squares of brightness of the fourth primary-color light and brightness of the fifth primary-color light has a minimum or a maximum; or a constraint condition that a sum of squares of brightness of the first primary-color light and brightness of the second primary-color light has a minimum or a maximum.

15. The method for controlling the display device according to claim 10, wherein the first light comprises first primary-color light, second primary-color light and third primary-color light; and the second light comprises fourth primary-color light and fifth primary-color light, wherein the first primary-color light and the fourth primary-color light are metameric light, the second primary-color light and the fifth primary-color light are metameric light, and The modulating the first light according to the first modulation data to generate first image light of the image to be displayed, and modulating the second light according to the second modulation data to generate second image light of the image to be displayed comprises: modulating the first primary-color light to the fifth primary-color light according to the modulation signal.

16. The method for controlling the display device according to claim 15, wherein
the first time period comprises a first sub-period for displaying the first primary-color light, a second sub-period for displaying the second primary-color light, and a third sub-period for displaying the third primary-color light;
the second time period comprises a fourth sub-period for displaying the fourth primary-color light and a fifth sub-period for displaying the fifth primary-color light, and the second time period further comprises a sixth sub-period in which no light is emitted; and
the controlling, according to the light source control signal, a light source system to emit first light comprising three primary-color components in the first time period and to emit second light comprising laser light in the second time period comprises: controlling the light source system to emit the first primary-color light to the fifth primary-color light respectively in the first sub-period to the fifth sub-period according to the light source control signal, and to no emit light in the sixth sub-period.

17. The method for controlling the display device according to claim 16, wherein
the modulation signal comprises first modulation data applied to the first time period and second modulation data applied to the second time period; and
the generating a light source control signal, first modulation data applied to the first time period, and second modulation data applied to the second time period according to original image data of each frame of the image to be displayed comprises:
calculating corrected image data of the image to be displayed according to input original image data based on three primary colors, a color conversion matrix of a color gamut to which the image to be displayed belongs, a color conversion matrix based on the first primary-color light to the fifth primary-color light, and a preset condition; and
calculating the first modulation data and the second modulation data based on the corrected image data, according to the corrected image data, a color conversion matrix of the color gamut corresponding to the corrected image data, and a color conversion matrix of the display device.

18. The method for controlling the display device according to claim 15, wherein the first time period comprises a first sub-period for displaying the first primary-color light, a second sub-period for displaying the second primary-color light, and a third sub-period for displaying the third primary-color light;
the second time period comprises a fourth sub-period for displaying the fourth primary-color light and a fifth sub-period for displaying the fifth primary-color light, and the second time period further comprises a sixth sub-period for displaying at least one of the third primary-color light, the fourth primary-color light and the fifth primary-color light; and
the controlling, according to the light source control signal, a light source system to emit first light comprising three primary-color components in the first time period and to emit second light comprising laser light in the second time period comprises: controlling the light source system to emit the first primary-color light to the fifth primary-color light respectively in the first sub-period to the fifth sub-period according to the light source control signal, and to emit at least one of the third primary-color light, the fourth primary-color light and the fifth primary-color light in the sixth sub-period.

19. The method for controlling the display device according to claim 18, wherein
the modulation signal comprises first modulation data applied to the first time period and second modulation data applied to the second time period; and
the generating a light source control signal, first modulation data applied to the first time period, and second modulation data applied to the second time period according to original image data of each frame of the image to be displayed comprises:
calculating corrected image data of the image to be displayed according to input original image data based on three primary colors, a color conversion matrix of a color gamut to which the image to be displayed belongs, a color conversion matrix based on the first primary-color light to the fifth primary-color light, and a preset condition; and
calculating the first modulation data based on the corrected image data, according to the corrected image data, a color conversion matrix of a color gamut corresponding to the corrected image data, and a color conversion matrix of the display device; and calculating the second modulation data based on the corrected image data, according to the corrected image data, the color conversion matrix of the color gamut corresponding to the corrected image data, the color conversion matrix of the display device, and a ratio of a duration of at least one of the third sub-period, the fourth sub-period and the fifth sub-period to a duration of the sixth sub-period.

20. The method for controlling the display device according to claim 17, wherein the preset condition comprises a constraint condition that a sum of squares of brightness of the fourth primary-color light and brightness of the fifth primary-color light has a minimum or a maximum; or a constraint condition that a sum of squares of brightness of the first primary-color light and brightness of the second primary-color light has a minimum or a maximum.

* * * * *